(12) United States Patent
O'Brien

(10) Patent No.: US 9,909,700 B2
(45) Date of Patent: Mar. 6, 2018

(54) TEE LOCK—LOCKOUT DEVICE

(71) Applicant: Production And Process Technologies Of Florida, Inc., Tampa, FL (US)

(72) Inventor: Joseph O'Brien, Ruskin, FL (US)

(73) Assignee: Production And Process Technologies Florida, Inc., Tampa, FL (US)

( * ) Notice: Subject to any disclaimer, the term of this patent is extended or adjusted under 35 U.S.C. 154(b) by 0 days.

(21) Appl. No.: 15/447,713

(22) Filed: Mar. 2, 2017

(65) Prior Publication Data

US 2017/0205008 A1 Jul. 20, 2017

Related U.S. Application Data

(62) Division of application No. 14/593,573, filed on Jan. 9, 2015, now Pat. No. 9,618,134.

(51) Int. Cl.
| F16L 35/00 | (2006.01) |
| F16K 35/06 | (2006.01) |
| F16J 13/06 | (2006.01) |
| F16L 41/04 | (2006.01) |

(52) U.S. Cl.
CPC ............ *F16L 35/00* (2013.01); *F16J 13/065* (2013.01); *F16K 35/06* (2013.01); *F16L 41/04* (2013.01); *F16L 2201/20* (2013.01)

(58) Field of Classification Search
CPC . F16K 35/06; F16L 35/00; F16L 41/04; F16L 2201/20; F16J 13/065

USPC ....... 70/18, 19, 164, 165, 232; 220/210, 214
See application file for complete search history.

(56) References Cited

U.S. PATENT DOCUMENTS

| 1,722,615 | A | 7/1929 | Widerberg |
| 2,117,473 | A | 5/1938 | Glab |
| 2,548,934 | A | 4/1951 | Beaird |
| 3,477,607 | A | 11/1969 | Fuzzell et al. |
| 3,615,036 | A | 10/1971 | Mross |
| 3,698,592 | A | 10/1972 | Nelson |
| 3,979,933 | A | 9/1976 | Mohrhoff |
| 4,253,583 | A | 3/1981 | Lynch |
| 4,428,395 | A | 1/1984 | Bravo |
| 4,466,551 | A | 8/1984 | Leung |
| 4,516,414 | A | 5/1985 | Woolvin |
| 4,613,055 | A | 9/1986 | Connors |
| 4,803,858 | A | 2/1989 | Parker |
| 4,864,696 | A | 9/1989 | Mittermaier et al. |
| 5,033,280 | A | 7/1991 | Johnson |
| 5,201,201 | A | 4/1993 | Sylvester et al. |
| 5,649,437 | A | 7/1997 | Royka, Jr. et al. |
| 8,770,220 | B1 | 7/2014 | Embry |
| 8,789,717 | B2 | 7/2014 | Payne |
| 2003/0005960 | A1 | 1/2003 | Benham |
| 2007/0256844 | A1 | 11/2007 | Blasing |
| 2013/0160870 | A1 | 6/2013 | Rohde |
| 2015/0075648 | A1 | 3/2015 | Rohde et al. |

*Primary Examiner* — Suzanne L Barrett
(74) *Attorney, Agent, or Firm* — Christensen, Fonder, Dardi & Herbert PLLC; Curtis Herbert

(57) ABSTRACT

The present invention provides a lockout device and system that can be attached directly to open piping undergoing maintenance or repair and that can be directly under the supervision of the individual that is performing the maintenance.

12 Claims, 11 Drawing Sheets

TEE LOCK—LOCKOUT DEVICE

CROSS REFERENCE TO RELATED APPLICATIONS

This Application is a divisional of application Ser. No. 14/593,573, filed Jan. 9, 2015, entitled "Tee Lock-Lockout Device".

FIELD OF THE INVENTION

The invention is directed an improved lockout/tagout (LO/TO) device for improved safety in industrial servicing and maintenance activities and particularly for use in open-ended piping.

BACKGROUND OF THE INVENTION

Lockout/tagout is a process by which a piece of equipment is secured against accidental energization during repairs or maintenance. Lockout/tagout procedures are designed to ensure energy sources are maintained in a "zero mechanical state" before and during repair or maintenance work on a piece of equipment or machinery. When working on equipment or machinery that is designed to move or has moving parts, it is important to recognize and control all possible energy sources: electrical, pneumatic, hydraulic, mechanical, chemical, thermal and stationary energy sources.

The United States Occupational and Health Administration (OSHA) has provided regulations for The Control of Hazardous Energy (Lockout/Tagout). Title 29 Code of Federal Regulations (CFR) Part 1910.147, addresses the practices and procedures necessary to disable machinery or equipment, thereby preventing the release of hazardous energy while employees perform servicing and maintenance activities. The standard outlines measures for controlling hazardous energies—electrical, mechanical, hydraulic, pneumatic, chemical, thermal, and other energy sources.

The first step in lockout/tagout is to determine and write down the energy source for the specific equipment. Many pieces of equipment have more than one energy source. For example, hydraulic or pneumatic presses have two energy sources: the electricity that runs the hydraulic or pneumatic pump and the stored pressure within the system. Then, the magnitude of power of each energy source must be determined and documented. For example, for a pneumatically driven press powered by electricity, the voltage of the electricity and pounds per square inch (psi) rating of the pneumatic or hydraulic system would be written down.

Lock vs. Tag

There are three allowable options for lockout/tagout: a lock alone, a tag alone (if it is not possible to install a lock) or, preferably, a lock and tag together. Locks alone create a safe situation but offer no explanation for the lockout. Although tags alone are permitted because some machines cannot be locked out, this is OSHA's least favorite method because it offers less of a guarantee for safety. Locks and tags together provide a visual and written explanation for lockouts while offering fail-safe protection from error.

If a tag is used alone, it must be demonstrated in the program that the tag offers the same level of employee protection as a lock and tag together. Additional training when only a tag is used is required because tags don't offer the same physical restraint as locks and employees must understand this. Although switches still can be activated, it is a safety hazard and a violation of the regulations and company policy to activate switches. Tagout devices must warn against a hazardous condition with a warning such as:
"Do Not Start"
"Do Not Open" "Do Not Close"
"Do Not Energize"
"Do Not Operate".

Locks

Although the installation of equipment-specific lockout devices is generally a simple matter, the cost can be prohibitive. Fortunately, OSHA doesn't require the purchase of specific lockout devices for each valve, switch or circuit; it requires only that the mechanism that controls the power to the machine be secured. If the power source can be secured with a chain or something as durable and difficult to defeat, it is acceptable to use such means.

Removing Lockout Devices

The simplest way to unlock and restart equipment once maintenance work is completed is to reverse the steps followed to shut down the equipment. This may not be possible with all machines, however.

The first thing that always should be done is to replace all guards and protective devices that were on the machine originally. Then, all unnecessary objects must be removed and all unessential personnel asked to leave the area. Next, all employees involved should remove their own locks. No employee should remove another person's lock. When an authorized employee who applied a lockout device to a piece of equipment or machinery is not available to remove the device, the employer may remove the device provided that procedures and training for such a removal have been developed, documented and incorporated in the employers' lockout/tagout program.

Hot Tap

The "hot tap" procedure is employed in repair, maintenance, and service activities, and involves the cutting and welding of equipment (pipelines, vessels or tanks) under pressure in order to install connections or appurtenances. It is commonly used to replace or add sections of pipeline without the interruption of service for air, gas, water, steam and petrochemical distribution systems. Special metal cutting and welding equipment and specific operating procedures are used to limit explosion hazards. The operation may be performed by in-house maintenance personnel or by outside contractors.

The use of "hot tap" procedures appears to avoid several safety risks, which would otherwise arise in servicing equipment, which is under pressure. First, process shutdowns and startups of equipment of this nature pose extreme hazards of explosions and fire due to the type of materials being handled, and the complexities of and potential interactions between materials being conveyed or otherwise available in the workplace. For example, during startup it is necessary to purge pipelines of air, water and/or inert gases before hydrocarbons are introduced. Malfunctions or operator errors during purging could easily create explosive mixtures in the equipment. In other instances, process shutdowns and startups can result in rapid condensation within the process equipment and may cause "water hammers," which are sudden pressure changes that can shake, vibrate and stress equipment to the extent that the pipeline breaks or connection leaks develop. Finally, a third class of hazard avoided is one created by the much higher level of worker activity required during a complete process shutdown or start-up. This may result in more extensive worker exposure to the hazards of the shutdown or start-up procedure, and in greater potential for injury than would be involved in performance of "hot tap" type activities, in which fewer employees would be exposed.

OSHA believes that employees performing hot tap operations should have comparable protection to workers performing other servicing or maintenance of machines or equipment. OSHA also believes that these operations should be allowed to be conducted when certain limited conditions exist, such as when continuity of service is essential and system shut down is impractical. By specifying these limitations the employer would be prohibited from conducting these operations simply as an expedient. The need for continuity of service would be illustrated by the pipeline containing a petroleum product where stopping the flow of the product and draining the pipeline could introduce an additional danger to employees since the concentration of the gaseous product remaining in the pipe, when mixed with air, could fall within the explosive range of the product, thereby threatening an employee with serious injury if that employee would attempt to weld on the pipe. In this case, shut down may not be practical because shutting down the system may prove more hazardous than allowing the continued operation of the system while the hot tap operation is being conducted. Another example would be when a large storage tank with a hazardous substance is punctured or otherwise penetrated. There is obviously little or no time available to continue the service (store the substance) and shut down the system (drain the tank). In this case, the hot tap operation could be safely and properly conducted if a documented procedure and the required equipment are used so that they provide effective protection for employees.

Fluids (Compressed Gases, Air, Steam, Hydraulics, Petroleum)

1. Compressed gas pressure systems are included under Title 29 and are required to be locked out/tagged out if pressures could result in unexpected movement of the equipment or components.

2. Equipment using air or other compressed gas must be equipped with a main line shut off valve capable of being locked out or tagged out in the "off" position.

3. Unless the compressed gas valve allows pressure release, a portion of the pipe shall be disconnected to allow pressure release if the trapped energy could create a possible hazard.

4. All compressed gas lines will be labeled. If labels do not exist, the employee shall notify their immediate supervisor and labeling will be applied.

Hydraulic Energy

Equipment using hydraulic pressure shall be locked out by placing the hydraulic pump motor electrical disconnect switch in the "OFF" position and applying a lockout/tagout device to the disconnect. Bleed off residual pressure in the piping system.

Food and Beverage

Food and beverage production is one of the most difficult and demanding environments for workplace safety products and identification. Harsh wash down cycles, chemical sanitizers, and constantly wet environments present reliability challenges requiring consistent maintenance and repair. While it is intuitive that liquid products, would require piping to facilitate their movement through the production process, dry granular solids, including (but not limited to) grains such as rice, corn, wheat and the like may be processed for marketing through piping systems. Of course, those of skill in the art will appreciate that there are many such dry, granular solids that are chemicals and other non-foodstuffs.

Work on Existing Piping Systems

Hazardous energy exists in piping systems, at least, in the form of steam, liquids, chemicals and dry granular solids. Program procedures for lockout/tagout should be followed when breaking into a line where there is potential for exposure to hazardous energy.

Many accidents occur because of the failure to verify that all energy sources have been isolated. In some instances, piping being serviced may be back-fed or be tapped into by several lines leading to an unexpected release. Process pipe drawings and/or plant maintenance personnel must be consulted to identify all lines feeding the system being serviced. In practice, the identification of all lines feeding into the system may not be obvious. There are instances where there are more than one source supplying a line to be disconnected and have work performed. When these multiple sources have limited chances for LO/TO, current methods are not enough to ensure the safety of the worker and the integrity of the line.

On steam systems above 15 psig, double valve protection is required when the work involved may jeopardize the integrity of the piping that the isolation valve is attached to. When working on a main steam line between two isolation valves of verified reliability, it is not necessary to close a second main steam valve upstream of the repair area. When working on a small diameter steam line such as a trap station line, the small diameter valve is not adequate isolation. The steam main valve on each side of the repair area must be closed. This distinction is necessary because of the possibility of breaking a smaller diameter valve and compromising the safety isolation.

On piping systems, the current method for lockout requires identifying the valves that control flow to the part of the system undergoing maintenance and locking out each one individually. The valves are then closed, and a cable is laced through the valve handle and tagged. Such valve-types include, but are not limited to, ball valves, butterfly valves, diaphragm valves, and gate valves. While with certain valve types, disabling a valve actuator may be as easy to accomplish as securing a cable through a hand wheel (such as with a gate valve), other valve types have only a handle (such as with a ball valve) or no handle at all, such as with a reversing valve. This makes lockout of such valve handles less easy.

Further, even in such situations, where a valve handle is easily secured, in many situations there are multiple valves leading to a piping section undergoing maintenance and repair. In such situations, there may be multiple valves in distant locales each under control of multiple individuals not personally undertaking the maintenance/repair. There are instances where there are more than one source supplying a line to be disconnected and have work performed. Therefore, the risk exists that either all the valves may not be shut off or that during maintenance someone may turn on a valve leading the maintenance section sending a fluid or gas to the repair site and causing injury to the repair crew.

Therefore, a need exists to provide a lockout system that does not require multiple lockout devices and is not remote from the supervision of the individual undertaking the repair at the locale where the maintenance is being performed.

SUMMARY OF THE INVENTION

The present invention provides a lockout device and system that can be attached directly to open piping undergoing maintenance or repair and that can be directly under the supervision of the individual that is performing the maintenance.

As discussed above, industries using piping and requiring open piping maintenance include, but are not limited to: food and beverage, chemicals, pharmaceuticals, energy production (including for use in refining, electricity generation, e.g., cooling pipes, steam pipes etc.). As is known to those of skill in the art, different applications require different size piping ranging from about ½ inch in diameter (such as, for example for hydraulic uses) to at least 10 inches in diameter and greater (such as for petroleum refining).

Therefore, in a first exemplary embodiment the invention includes a lockout system for open-ended piping comprising: a) a T-lock; b) a locking shaft; and c) a clamp assembly. In some exemplary embodiments the invention also includes a lock. In various aspects of this embodiment the lock may be a padlock, a pin lock or a tube lock. In various other exemplary embodiments, the invention may also include stainless and/or sanitary grade stainless steel components including all or part of the T-lock, the locking shaft and/or the clamp assembly. Of course, in those embodiments where the piping under repair/maintenance does not require sanitary grade, the components may be stainless steel, steel, acceptable metals, alloys or polymers. In some exemplary aspects, the system also includes a ferrule dimensioned and configured to fit on the open piping and/or and end cap dimensioned and configured to fit with the ferrule and thereby closing off the open ended piping when in the locked configuration.

In yet another exemplary embodiment, the invention provides a lockout device for closing open-ended piping comprising a T-lock, the T-lock comprising: a handle, a shaft and two or more opposing flanges connected to the shaft at the end opposite the handle. The device also includes a locking shaft connected to the handle and extending through opposing flanges; and a clamp assembly comprising: a clamp; one or more security flanges attached to the clamp a ferrule and an endcap dimensioned and configured to fit and occlude the open-ended piping. In this exemplary embodiment, when the device is in the closed position, the ferrule and the end-cap are locked over the open ended piping closing the piping from the expulsion of contents such as, liquids, gasses, free flowing granulars and steam.

In still another exemplary embodiment, the invention provides a method for locking out open-ended piping for maintenance, repair or construction comprising: a) placing a ferrule in the open end of the piping, the ferrule dimensioned to be accepted by the piping; b) placing an end-cap (blank) to the ferrule, the end-cap dimensioned to occlude the opening in the piping; c) placing a clamp around the end-cap and ferrule, the clamp having one or more security flanges protruding therefrom and a threaded bar connected to the one or more flanges; d) screwing a locking shaft, having one or more locking holes displaced therein over the threaded bar thereby tightening the clamp over the ferrule and end-cap; e) attaching a T-lock handle to the locking shaft the T-lock handle having a shaft displaced perpendicular thereto and the shaft having one or more locking flanges opposite to the handle; the T-lock shaft further including one or more locking holes dimensioned and configured to align with the one or more holes in the locking shaft when in the closed position; f) inserting a locking device through the aligned holes in the locking shaft and the T-lock shaft; and g) locking the locking device; thereby locking the clamp around the ferrule and end-cap occluding the open-ended piping and providing a lockout device.

These and other exemplary embodiments of the invention will be made more clear in view of the following discussion of the figures and detailed description of the invention that follows.

BRIEF DESCRIPTION OF THE FIGURES

Various exemplary embodiments of the networks, systems and methods according to the invention will be described in detail, with reference to the following figures wherein.

DETAILED DESCRIPTION OF THE EXEMPLARY EMBODIMENTS

The present invention provides a lockout device and system that can be attached directly to open piping undergoing maintenance or repair and that can be directly under the supervision of the individual that is performing the maintenance.

Figure 1:
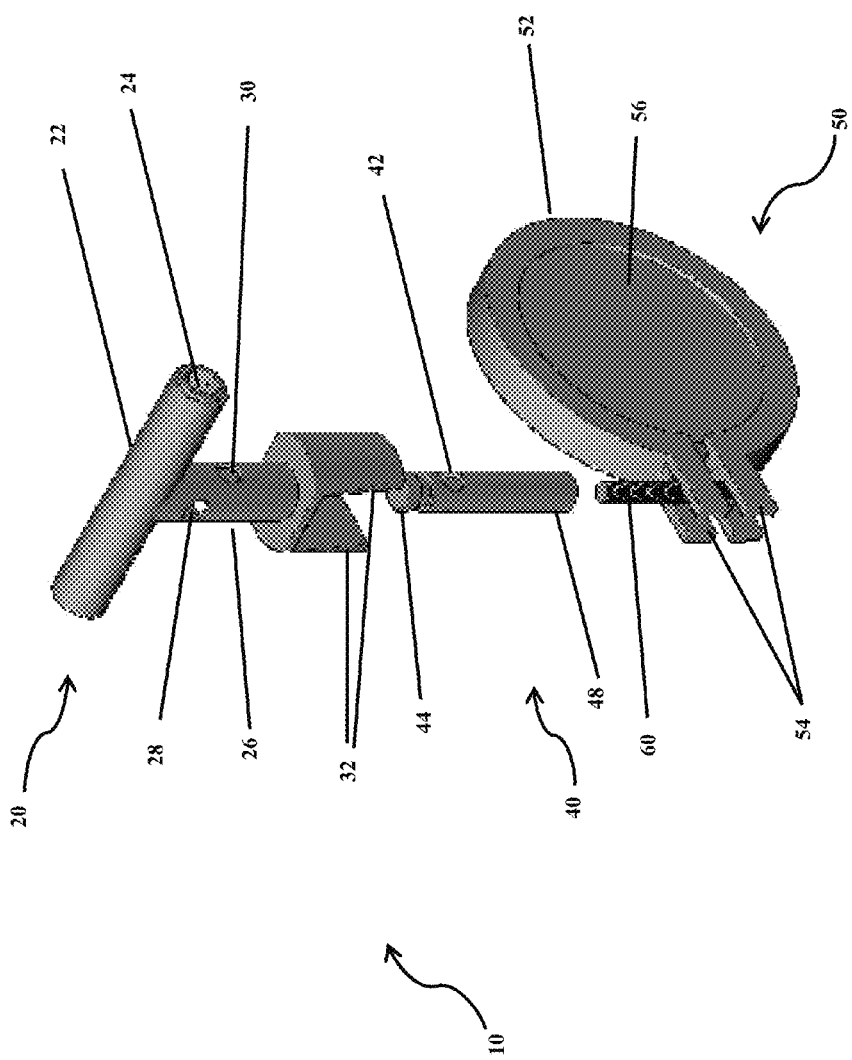
FIG. 1 is an isometric, exploded view of one embodiment of a lockout device in the open position according to the invention.

FIG. 1 is an isometric view of one exemplary embodiment of the lockout device 10 according to the invention. As shown, the device 10 includes a T-lock 20, a locking shaft 40 and a clamp assembly 50. In the embodiment shown in FIG. 1, the clamp is a "tri-clamp". As used herein, a "tri-clamp" assembly means a circular clamp having a circular portion comprising two semi-circular portions connected and articulated at one end of the circular circumference and an open-ended portion at an opposite end of the circumference through which a bolt can be passed through flanges present on each of the semicircular portions and tightened to decrease the circumference of the clamp around circular piping or tubing.

FIG. 1 shows, in this exemplary embodiment, the T-lock comprises a handle 22, a socket 24 inserted in handle 22, a shaft 26 extending from the handle and at least two locking flanges 32 extending from the shaft at the opposite end of the shaft 26 from the handle 22. In this embodiment, socket 24 is dimensioned and configured to fit bolt head (or nut) 44 for use in tightening locking thread 40 as described below. In various embodiments, the handle and shaft may be fabricated from stainless steel tubing although other materials may be used when sanitary conditions are not required. For example, steel, copper, iron or various polymers such as fiber-reinforced polymers (FRP) may be used. In addition, the shaft 26 includes passages or holes 28, 30 through the shaft dimensioned and configured to allow passage of a lock through the shaft. In those instances where the shaft 28 is tubing, the passages 28, 30 may be holes drilled in the opposing sides of the shaft 26. Locking thread locking hole 42 is dimensioned and configured to mate with either locking hole 28 or 30 on shaft 26. Because there are two sets of locking holes, 28 and 30, perpendicular in their axis to each other, locking thread 40 can be tightened on threaded bar 60 such that clamp 50 remains tight and either the first locking hole 28 or second locking hole 30 will mate appropriately such that flanges 32 securely lock security flanges 54 in place. This arrangement provides that only a quarter turn of locking thread 40 is required to securely dispose locking shaft 48 against the circular clamp 52 rather than a half-turn, which increases the security of the lockout.

In various exemplary embodiments a socket 24 is fixed in at least one end of handle 22. The socket is designed and configured to mate with locking thread bolt head 44 so that no extra tools other than the lockout device 10 is necessary to install the lockout device 10.

FIG. 1 also illustrates the locking shaft 40 according to this embodiment of the invention. As shown, the locking shaft 40, may be a tubular structure such as threaded piping or a bolt that has been tapped and threaded to mate with a threaded bar 60 on the tri-clamp assembly. In various embodiments, the locking thread 40 has a bolt head 44 designed and configured to fit within the T-lock shaft 26

Referring again to FIG. 1, also shown is the tri-clamp assembly 50 comprising a circular clamp 52, security flanges 54 and end cap 56, a ferrule (not shown) dimensioned and configured to fit around and partially within the open-ended piping (not shown) and a threaded bar 60 dimensioned and configured to mate with a thread with the tapped or threaded shaft 48.

Figure 2:
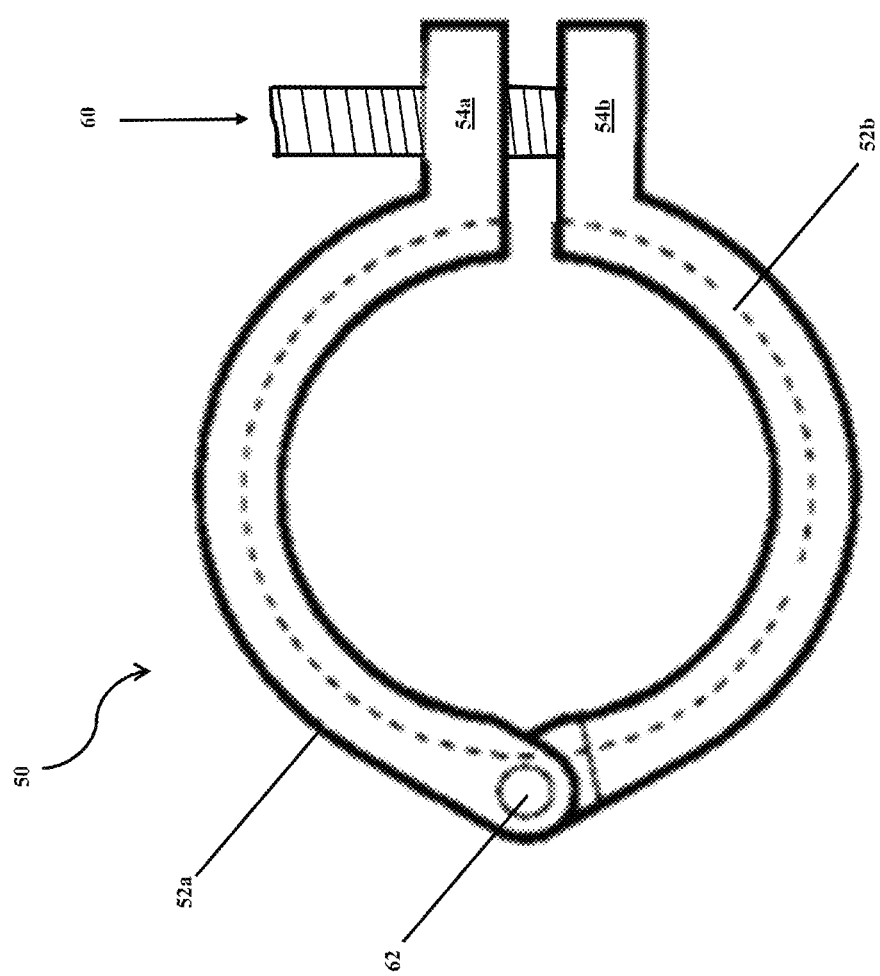
FIG. 2 is a schematic view of one embodiment of a clamp, a tri-clamp, commercially available, according to one embodiment of the invention.

FIG. 2 is a side plan view of a typical tri-clamp assembly 50 according to the invention. As illustrated, in this embodiment, the tri-clamp assembly includes circular clamp 52 comprising a first semi-circular portion 52a and a second semicircular portion 52b connected by an articulation pin 62. Each semi-circular portion includes a security flange 54a and 54b. In the embodiment shown, threaded bar 60 is fixed to security flange 54b and passes through a complementary passage or hole 64 (not shown) in security flange 54a. In use, the clamp 50 is opened and passed around piping (not shown) and closed allowing bar 60 to pass through passage 64. The locking thread 40 can then be screwed onto threaded bar 60 bringing security flanges 52a and 52b together and tightening the tri-clamp around the ferrule 58/piping (not shown)/endcap 56 assembly.

In use, the tri-clamp ferrule 58 is applied to the open ended piping. The tri-clamp end cap 56 has a lip (not shown) that fits within the ferrule 58 and is applied to the open-ended piping (not shown) and ferrule 58. Circular clamp 52 is then applied to the outer diameter of the piping at the juncture of the ferrule 58/piping/endcap 56. Locking shaft 40 is screwed down on threaded bar 60 until it impinges on flanges 54 and tightened securely reducing the circumference of circular clamp 52 around the open end of the piping. When tightened, clamp 50 secures cap 56 and ferrule 58 occluding the open-ended piping. The T-lock 20 is placed over locking thread 40 until locking flanges 32 on the T-lock 20 embrace security flanges 54 on the tri-clamp 50 and a locking device 70 (FIG. 3), such as a padlock, locks the entire assembly 10 in place. With this arrangement, ferrule 58 and end cap 56 are securely locked over the end of the open piping sealing the end of the piping. It should be noted that threaded bar 60 is affixed to flanges 54 so that it is immovable. Such attachment may be made by welding, a pin connection or the like.

Those of skill in the art will appreciate that clamps compatible with open-ended piping, generically known as "union clamps" are commercially available, such as from, for example, Sanitube, LLC (Eaton Park Fla.), WCB-Flow Products (Buffalo, N.Y.) and Nelson-Jameson (Marshfield, Wis.). In various exemplary embodiments, various kinds of union clamps useful in the invention include, but are not limited to, tri-clamps, "S-clamps", "I-clamps", segment clamps, "Q-clamps" and the like.

Figure 3:
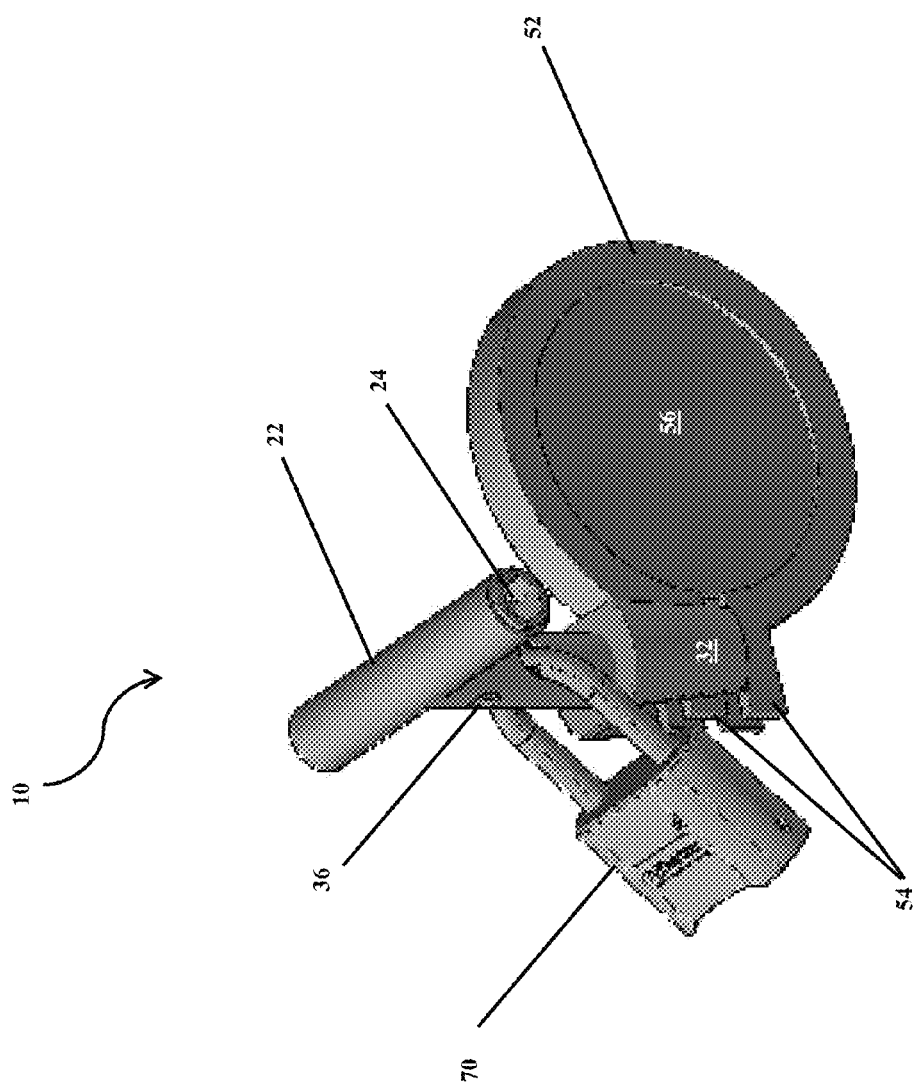
FIG. 3 is an isometric view of the lockout device as shown in FIG. 1, in the closed and locked position.

FIG. 3 is an isometric view of the embodiment of lockout device 10 as shown in FIG. 1, in its closed and locked configuration. As shown, the T-lock 20 is fitted over locking shaft 40 (not visible) which has been screwed down and tightened over threaded bar 60 (not visible) bringing locking flanges 32 of T-lock 20 down over security flanges 54 of the tri-clamp assembly 50 and locked in place with a lock 70 passing through second locking hole 30 of T-lock and locking hole 42 of the locking shaft 40, locking the lockout device in place over the open ended piping. In use, flanges 32 make it is impossible for the Tee Lock to be turned in either direction. Flanges 32 obstruct any access to or movement of tri-clamp 50. Lock 70 secures the T-Lock handle in place preventing anyone from mistakenly opening the lockout device 10.

Figure 4:
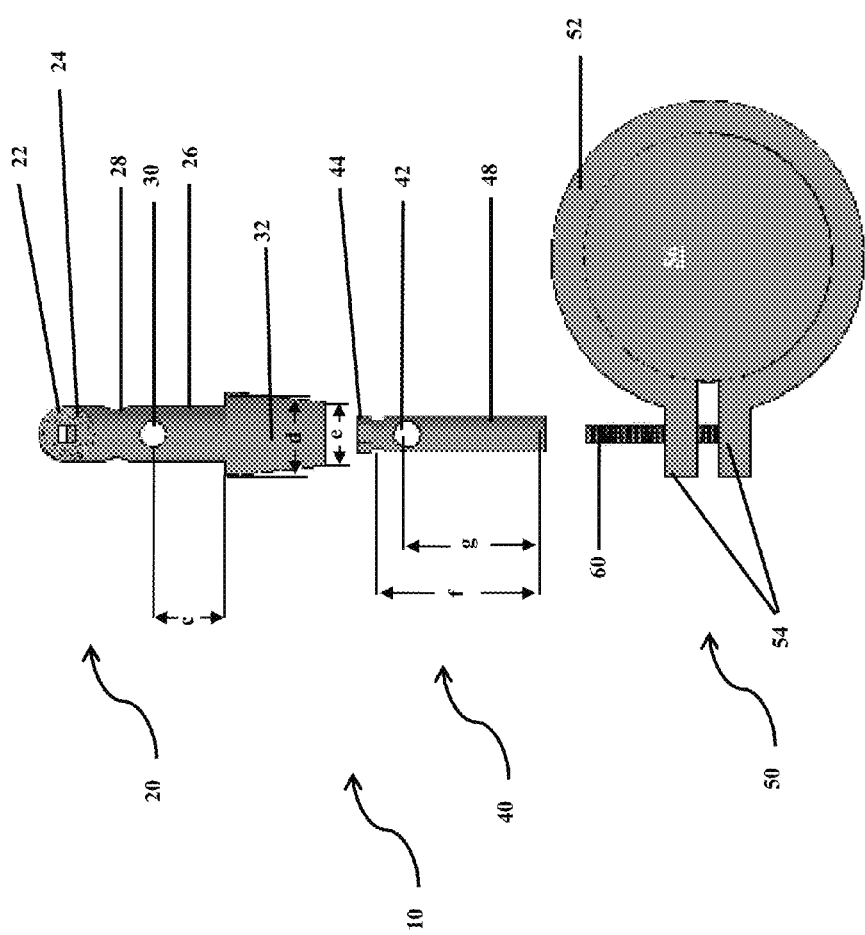
FIG. 4 is an exploded, front-plan view of the embodiment of the device shown in FIG. 1.

FIG. 4 illustrates an exploded front elevation view of the embodiment of the lockout device 10 illustrated in FIGS. 1 and 3 and showing exemplary dimensions usable in the invention. For example, in the exemplary embodiment shown in FIG. 4 the distance 'c' between the locking hole 30 and the flanges 32 is about 1 inch. The distance 'd' across the top of the locking flange may be about 1⅛ inch. The distance 'e' along the base of the locking flanges 32, may be about ⅞ inch. The inventors note that while these dimensions require tapered flanges 32, it is well within the scope of the invention to use flanges 32 which are not tapered.

FIG. 4 also illustrates exemplary dimensions of locking shaft 40. In this embodiment, the distance from the neck of the shaft or bolt 40 and the end of the bolt 'f' may be about 2 3/16 inches while the on-center distance 'g' from locking hole 42 to the end of the shaft 40 may be about 1⅞ inches. In this exemplary embodiment, the locking device is dimensioned and configured to be used on 2 inch-diameter piping. Those of skill in the art will recognize that the dimensions disclosed will vary relative to the diameter of the piping needing a lockout device.

Figure 5:
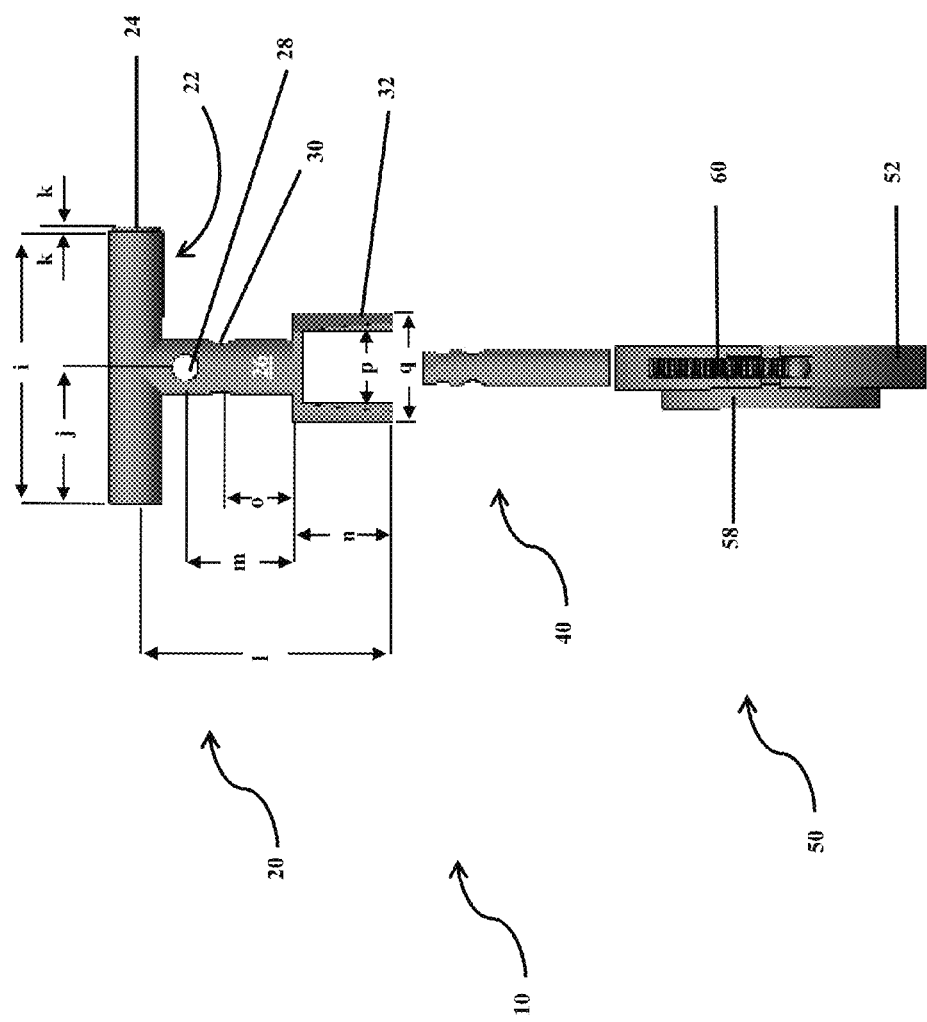
FIG. 5 is an exploded, left elevation view of the embodiment of the device illustrated in FIG. 1.

FIG. 5 is a left elevation view of the embodiment of lockout device 10 as shown in FIG. 1 and provides front dimensions for this embodiment of the lockout device 10. As shown, in this embodiment, the width of handle 22, 'I' is about 3¾ inches. The distance 'j' from the end of the handle to the center point of locking hole 28 may be about 1⅞ inches. In come embodiments, socket 24 may protrude from the end of handle 22, 'k-k' by about 1/16 inch. Other dimensions shown in the embodiment of the invention 10 illustrated in FIG. 4 include 'l' the distance from the center of handle 22 to the end of locking flanges 32 may be about 3 9/16 inches. The distance 'm' from the center of the first locking hole 28 to the end of the shaft 26 may be about 1½ inches. The distance 'o' from the second locking hole 30 and the end of the shaft 26 may be about 1 inch. FIG. 5 also illustrates exemplary dimensions of locking flanges 32 according this embodiment. 'n' illustrates, locking flanges 32 of about 1⅜ inches in length, the distance 'p' between the interior surfaces of the flanges 32 may be about 1 inch while the distance 'q' between the outer surfaces of the flanges 32 may be about 1½ inch. In some embodiments, the thickness of each flange 32 may be about ¼ inch and may be sanitary grade stainless steel.

FIG. 5 also illustrates ferrule 58 that fits within and around the lip of open ended piping and held in place by clamp 52. Also shown is threaded by 60. The end cap 56 is not visible in this view.

Figure 6:
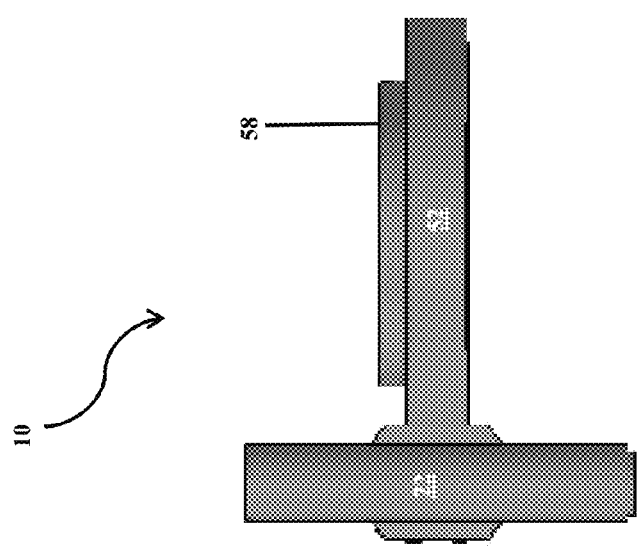
FIG. 6 is a top-plan view of the embodiment of the device shown in FIG. 1.

FIG. 6 is a top plan view of the embodiment of the invention 10 shown in FIG. 1. Visible are T-lock handle 22, tri-clamp assembly circular clamp 52 and ferrule 58.

Figure 7:
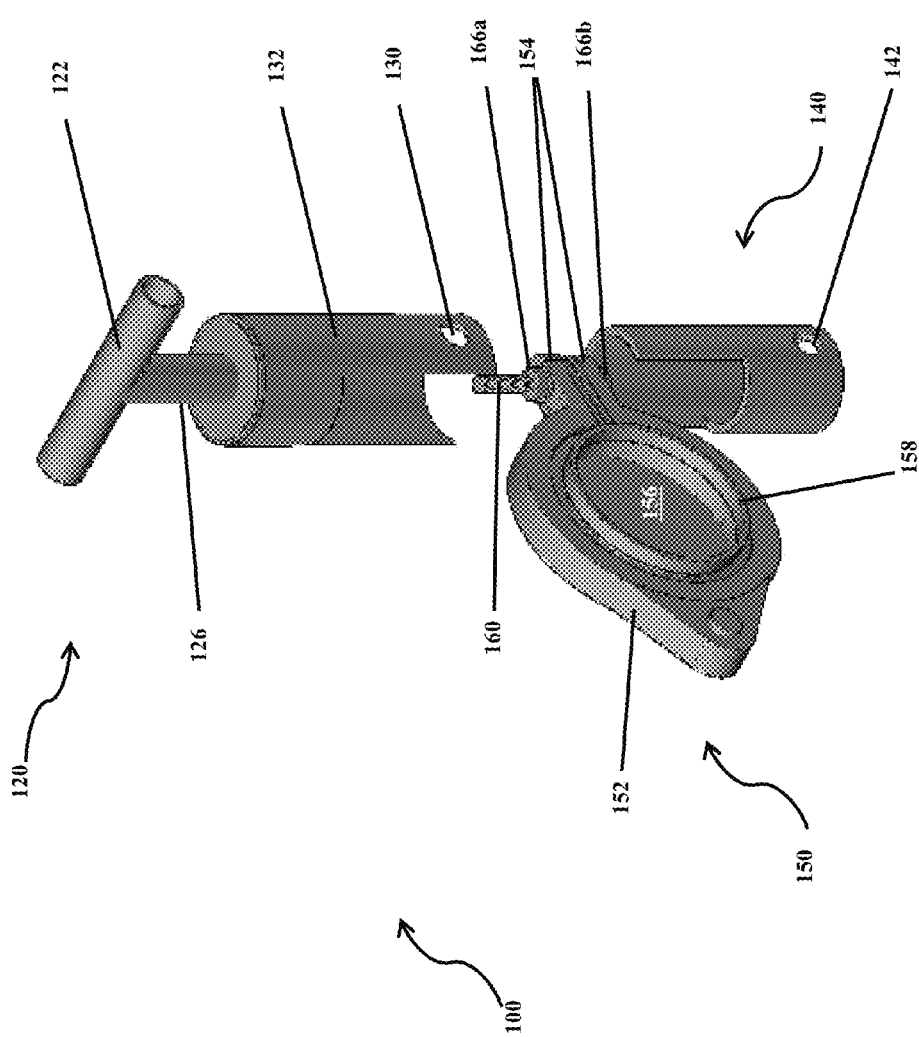
FIG. 7 is an isometric view of a second exemplary embodiment of a T-lock, lockout device according to the invention.

FIG. 7 is an isometric view of a second exemplary embodiment of the lockout device according to the invention. In this embodiment, the union clamp assembly is an "I" line clamp assembly. As shown the lockout device 100 includes a T-lock 120, the Mine clamp assembly and a male insert 140 including security holes 142. As shown the T-lock handle 120 includes a handle 122, a shaft 126, a female sleeve 132 and a locking hole 130 in the end of the sleeve 132 distal to handle 122.

The I-clamp assembly 150 includes a clamp 152, at least two security flanges 154 an end cap and a ferrule, dimensioned and configured to accept the open-ended piping requiring lockout. I-clamp assembly 150 also includes a threaded bar 160 dimensioned and configured to pass through passages (not shown) in security flanges 154. Also shown is bolt 160 including nut 166a and bolt head 166b. Nut 166a dimensioned and configured to accept threaded bolt 160 such that nut 166a and bolt 160 can be tightened on flanges 154 tightening clamp 152 containing ferrule 158 and end cap 156 on the open-ended piping (not shown).

Figure 8:
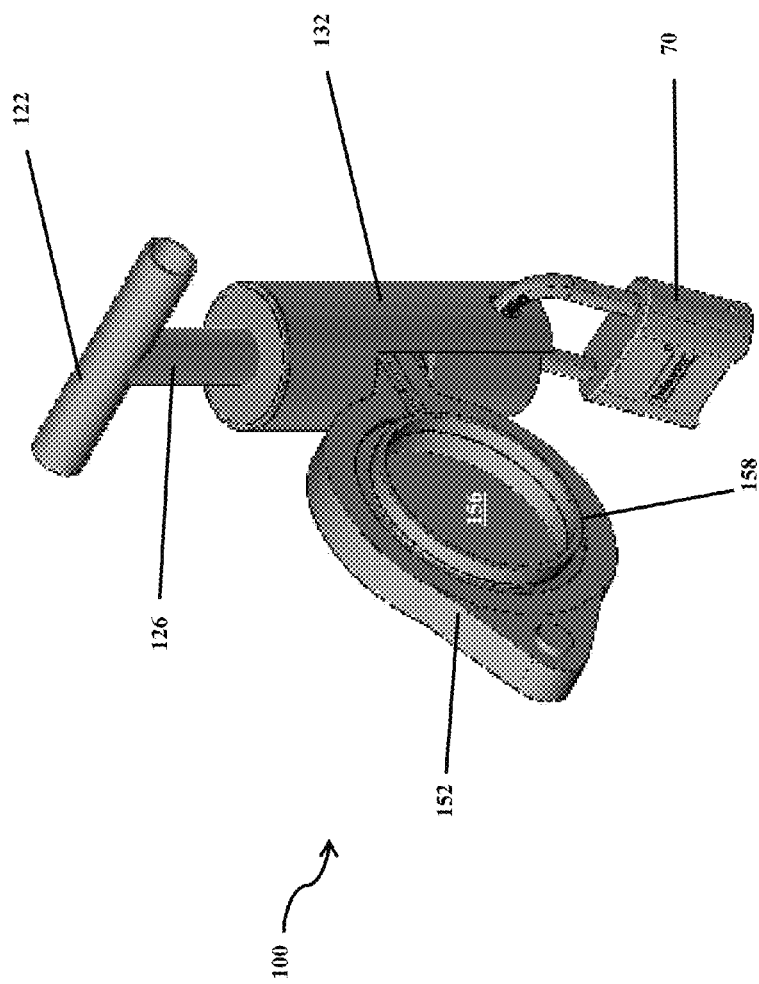
FIG. 8 is a second isometric view of the T-lock, lockout device according to the exemplary embodiment shown in FIG. 7.

FIG. 8 is a second isometric view of the lockout device according to the exemplary embodiment of the invention shown in FIG. 7. In the view shown in FIG. 8, the lockout device 100, is in the closed and locked position (the open-ended piping not shown). In this view, clamp 152 has been secured around ferrule 158 and end cap 156 by tightening nuts 166a and 166b on threaded bar 160 and closing flanges 154 around end cap 156 (not visible). The female sleeve 132 has been pushed down over male insert 140 such that locking hole 130 has been juxtaposed next to security hole 142. A locking device 170 such as a padlock has been inserted through holes 130 and 142 securing the lockout device over the open-ended piping.

Figure 9:
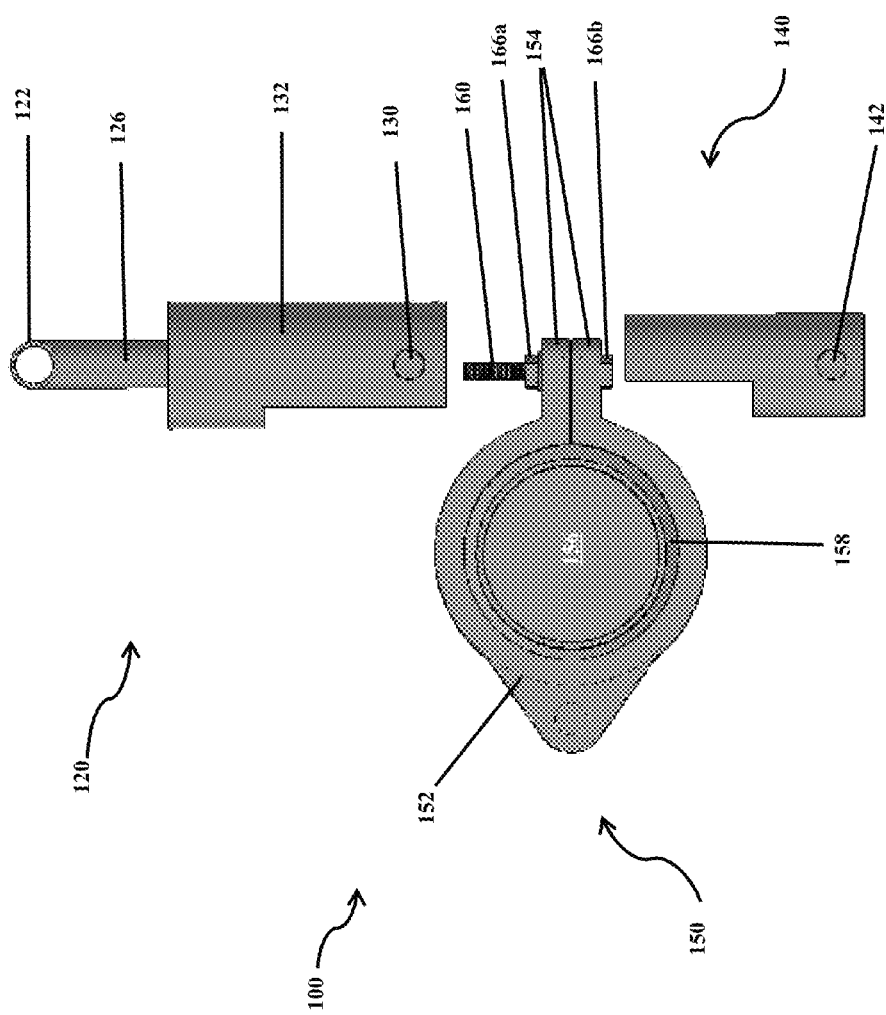
FIG. 9 is a front elevation view of the T-lock, lockout device shown in FIGS. 7 and 8.

FIG. 9 is an exploded front elevation view of the lockout device 100 illustrated in FIGS. 7 and 8 providing a better illustration of the relationship of threaded bar 160, security flanges 154 and nuts 166a and 166b.

Figure 10:
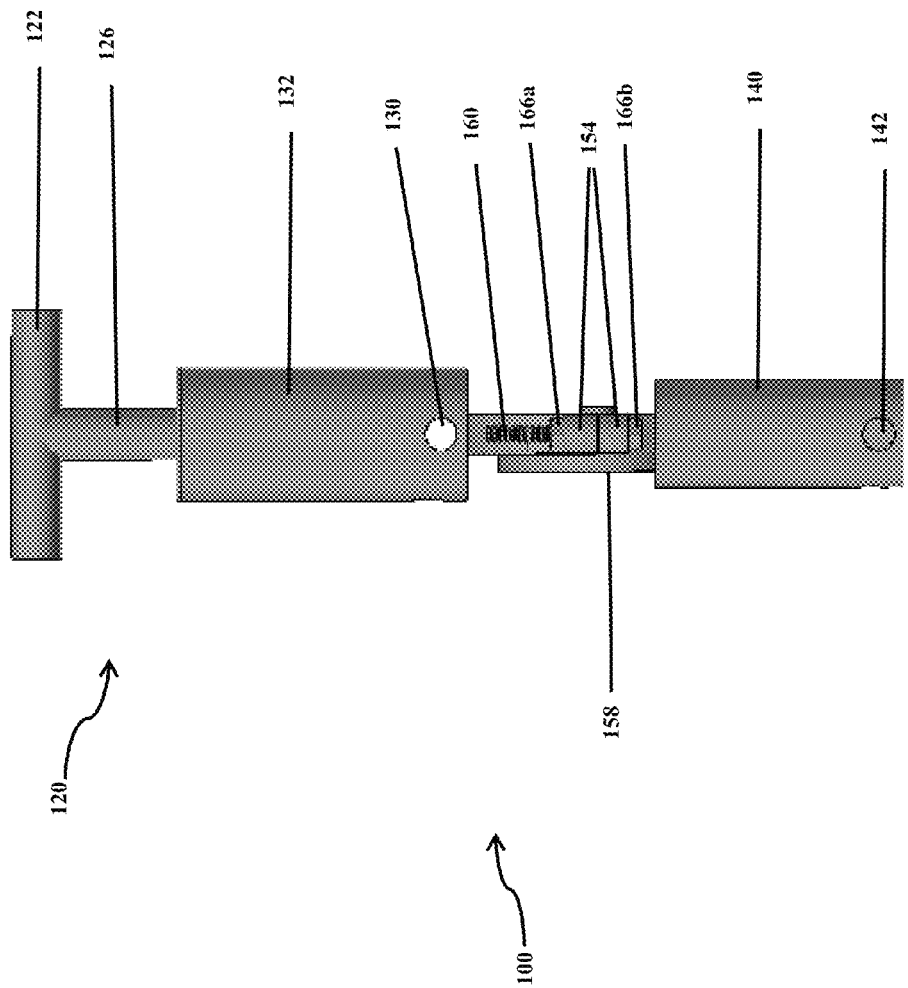
FIG. 10 is a right elevation view of the T-lock, lockout device shown in FIGS. 7-9.

FIG. 10 is an exploded right elevation view of lockout device 100. In this view nuts 166a and 166b have been threaded onto bar 160 so as to close flanges 154 tightening clamp 152 (not shown) around open-ended piping (not shown).

Figure 11:
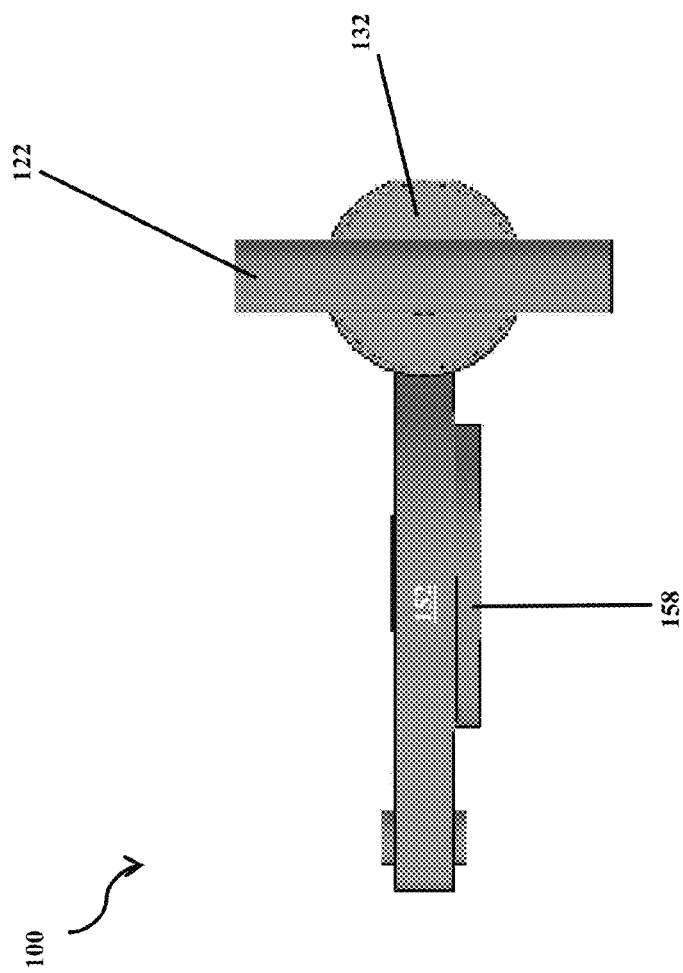
FIG. 11 is a top-plan view of the T-lock, lockout device shown in FIGS. 7-10.

FIG. 11 is a top plan view of the exemplary embodiment of the locking device 100 illustrated in FIG. 7.

The following paragraphs enumerated consecutively from 1 through 22 provide for various aspects of the present invention. In one embodiment, in a first paragraph (1), the present invention provides:

1. A lockout system for open-ended piping comprising:
 a. a tee lock
 b. a locking shaft
 c. a clamp assembly
 wherein the clamp assembly includes a ferrule and an endcap dimensioned and configured to fit within the open-ended piping.

2. The lockout system of paragraph 1, wherein one or more of the T-lock, locking shaft or the clamp assembly is made from sanitary grade stainless steel.

3. The lockout system of paragraphs 1 and 2, further including a lock.

4. The lockout system of paragraphs 1 through 3, wherein the lock comprises a padlock, a tube lock or a pin lock.

5. The lockout system of paragraphs 1 through 4, further including a socket maintained within the handle tubing.

6. The lockout system of paragraphs 1 through 5 wherein the lock passes through the T-lock and the locking shaft, locking the clamp assembly in place.

7. The lockout system of paragraphs 1 through 6 wherein the ferrule is locked in place by the clamp.

8. The lockout system of paragraphs 1 through 7 wherein the end-cap is locked in place by the clamp.

9. The lockout system of paragraphs 1 through 8, wherein the clamp is a union clamp.

10. The lockout system of paragraphs 1 through 9 where in the union clamp is an S-line clamp, an I-line clamp, a segment clamp or a Q-line clamp.

11 A lockout device for closing open-ended piping comprising:
 a. a T-lock the tee lock comprising:
  i. a handle
  ii. a shaft, perpendicular and connected to the handle; and
  iii. two opposing flanges connected to the shaft at the end opposite the handle;
 b. a locking shaft connected to the handle and extending through the opposing flanges;
 c. a clamp assembly comprising:
  i. a clamp;
  ii. one or more security flanges attached to the clamp;
  iii. a ferrule, dimensioned and configured to fit within the open-ended piping;
  iv. an end-cap;
 wherein, when the device is in the closed position, the ferrule and end-cap are locked over the open ended piping closing the piping from the expulsion of liquids, gasses, dry granular solids and steam.

12. The device of paragraph 11, wherein, when use requires a sanitary standard, one or more of the T-lock, locking shaft and tri-clamp are fabricated from sanitary grade stainless steel.

13. The device of paragraphs 11 through 12, wherein a lock is securable through the T-lock shaft and locking shaft, locking the lockout device in the closed position.

14. The device of paragraphs 11 through 13, wherein the T-lock shaft, and locking shaft have at least one pair of holes through the T-lock shaft and the locking shaft opposable such that when the device is in the closed position, a lock can be inserted through the holes, locking the device in the closed position.

15. The device of paragraphs 11 through 14, wherein the lock is a padlock, a pin lock or a tubular lock.

16. The device of paragraphs 11 through 15, wherein the lock is a padlock, a pin lock or a tubular lock.

17. The device of paragraphs 11 through 16, wherein the clamp is a union clamp.

18. The device of paragraphs 11-17 wherein the union clamp is an S-line clamp, an I-line clamp, a segment clamp or a Q-line clamp.

19. A method for locking out open-ended piping comprising:
   a. placing a ferrule in the open end of the piping, the ferrule dimensioned to be accepted by the piping;
   b. placing an end-cap in the ferrule, the end-cap dimensioned to occlude the opening in the piping;
   c. placing a clamp, the clamp having one or more security flange protruding therefrom, around the end-cap and ferrule and a threaded bar connected to the one or more flanges;
   d. screwing a locking shaft, having one or more locking holes displaced therein over the threaded bar thereby tightening the clamp over the ferrule and end-cap;
   e. attaching a T-lock handle to the locking shaft, the T-lock handle having a shaft displaced perpendicular thereto and the shaft having one or more locking flanges opposite to the handle; the T-lock shaft further including one or more locking holes dimensioned and configured to align with the one or more holes in the locking shaft when in the closed position;
   f. inserting a locking device through the aligned holes in the locking shat and the T-lock shaft; and
   g. locking the locking device;
   wherein locking the clamp around the ferrule and end-cap occluding the open-ended piping and providing a lockout device.

20. The method of paragraph 19, further comprising tightening with a socket, inserted in the handle of the T-lock dimensioned to engage the locking thread bolt head.

21. The method of paragraph 20, wherein the clamp is a union clamp.

22. The method of paragraph 21, wherein the union clamp is a tri-clamp, an I-line clamp, an S-line clamp, a segment clamp or a Q-line clamp.

The features of the present invention have been described in detail with respect to specific embodiments thereof, but it will be apparent that numerous variations and modifications are possible without departing from the spirit and scope of the inventive embodiments as defined by the claims. Likewise one skilled in the art will recognize that the order of certain steps in the claims may be combined, deleted or rearranged without departing from the spirit and scope of the inventive embodiments.

What is claimed is:

1. A lockout device for closing open-ended piping comprising:
   a. a T-lock the tee lock comprising:
      i. a handle
      ii. a shaft, perpendicular and connected to the handle; and
      iii. a sleeve or one or more flanges connected to the shaft at the end opposite the handle and including one or more locking holes;
   b. a threaded bar;
   c. a clamp assembly comprising:
      i. a clamp;
      ii. one or more security flanges attached to the circular clamp;
      iii. a ferrule, dimensioned and configured to fit within the open-ended piping;
      iv. an end-cap;
   d. an insert, dimensioned and configured to mate with the sleeve and including one or more security holes; and
   wherein, when the device is in the closed position, the ferrule and end-cap are locked over the open ended piping by the clamp, closing the piping from the expulsion of liquids, gasses, dry granular solids and steam and the sleeve and the insert are mated, enclosing the clamp assembly, wherein the one or more locking holes are juxtaposed to the one or more security holes.

2. The device of claim 1, wherein, when use requires a sanitary standard, one or more of the T-lock, locking shaft and tri-clamp are fabricated from sanitary grade stainless steel.

3. The device of claim 1, wherein a lock is securable through the T-lock shaft and locking shaft when closed, locking the lockout device in the closed position.

4. The device of claim 1, wherein the T-lock shaft, and locking shaft have at least one pair of holes through the T-lock shaft and the locking shaft opposable such that when the device is in the closed position, a lock can be inserted through the holes, locking the device in the closed position.

5. The device of claim 3, wherein the lock is a padlock, a pin lock or a tubular lock.

6. The device of claim 4, wherein the lock is a padlock, a pin lock or a tubular lock.

7. The device of claim 1, wherein the clamp is a union clamp.

8. The device of claim 7, wherein the union clamp is a tri-clamp, an S-line clamp, an I-line clamp, a segment clamp or a Q-line clamp.

9. A method for locking out open-ended piping comprising:
   a. placing a ferrule in the open end of the piping, the ferrule dimensioned to be accepted by the piping;
   b. placing an end-cap over the ferrule, the end-cap dimensioned to occlude the opening in the piping;
   c. placing a clamp around the end-cap and ferrule, the clamp having one or more security flanges protruding therefrom and a threaded bar connecting the one or more flanges;
   d. tightening one or more locking nuts on the threaded bar thereby tightening the clamp over the ferrule and endcap;
   e. attaching a T-lock handle to an insert that comprises one or more security holes, the T-lock handle having a sleeve displaced perpendicular thereto, with the sleeve having one or more locking holes dimensioned and configured to align with the one or more security holes in the insert when in the closed position; wherein the sleeve and the insert enclose the clamp;
   f. inserting a locking device through the aligned locking holes in the sleeve and security holes in the insert; and
   g. locking the locking device;
   wherein locking the tightened clamp around the ferrule and end-cap locks out the open-ended piping.

10. The method of claim 7, further comprising tightening with a socket, inserted in the handle of the T-lock dimensioned to engage the locking thread bolt head.

11. The method of claim 9, wherein the clamp is a union clamp.

12. The method of claim 11, wherein the union clamp is a tri-clamp, an I-line clamp, an S-line clamp, a segment clamp or a Q-line clamp.

* * * * *

UNITED STATES PATENT AND TRADEMARK OFFICE
CERTIFICATE OF CORRECTION

PATENT NO. : 9,909,700 B2
APPLICATION NO. : 15/447713
DATED : March 6, 2018
INVENTOR(S) : Joseph O'Brien Page 1 of 1

It is certified that error appears in the above-identified patent and that said Letters Patent is hereby corrected as shown below:

In the Specification

Column 9, Line 19, please delete "the Mine clamp assembly" and insert --the I-line clamp assembly--.

Signed and Sealed this
First Day of May, 2018

Andrei Iancu
*Director of the United States Patent and Trademark Office*